United States Patent [19]
Seiffert

[11] Patent Number: 6,031,616
[45] Date of Patent: Feb. 29, 2000

[54] LASER PULLEY ALIGNMENT SYSTEM

[76] Inventor: Russell W. Seiffert, 6314 Scottsboro La., Garland, Tex. 75044

[21] Appl. No.: 09/318,543

[22] Filed: May 25, 1999

[51] Int. Cl.[7] .................................................. G01B 11/00
[52] U.S. Cl. .......................................... 356/399; 356/400
[58] Field of Search ................................... 356/363, 399, 356/400, 401

[56] References Cited

U.S. PATENT DOCUMENTS 5,237,390  8/1993  Chaney ..................................... 356/363

*Primary Examiner*—Robert H. Kim
*Attorney, Agent, or Firm*—Gregory M. Howison; Mark W. Handley

[57] ABSTRACT

A method and apparatus are provided for aligning first and second rotary members with a single alignment plane, such that respective axes about which the first and second rotary members rotate are substantially perpendicular to the alignment plane. A first fixture has a first lineal indicator mark and a line generator, which emits a planar light signal. The first fixture is engaged with the first rotary member to align the lineal indicator mark and the planar light signal in a fixed relation with respect to the axis of the first rotary member, perpendicular to the axis of the first rotary member. A second fixture is engaged with the second rotary member to align a reflective surface and a second lineal indicator mark mounted to the second fixture in fixed relation to the axis of the second rotary member. Then, the first and second rotary members are moved to align the planar light signal with the reflective surface and the second lineal indicator mark of the second fixture, such that the planar light signal overlays both the second lineal indicator mark and is reflected from the reflective surface to overlay the first lineal indicator mark of the first fixture. This aligns the respective axis of the first and second fixtures in parallel, and substantially perpendicular to the planar light signal which then defines single alignment plane.

25 Claims, 3 Drawing Sheets

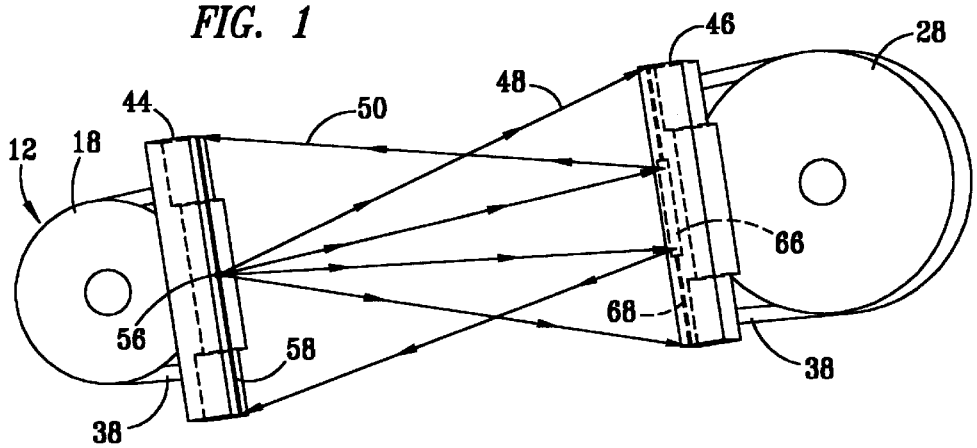
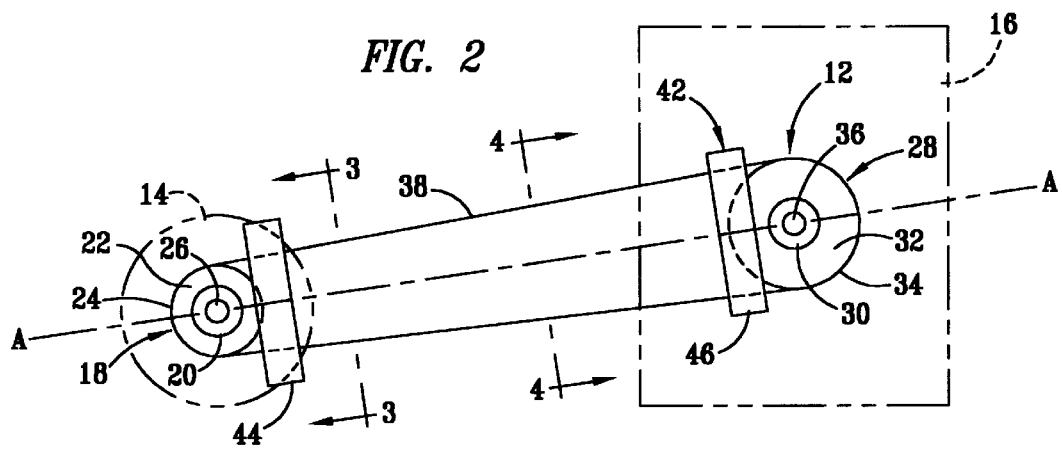
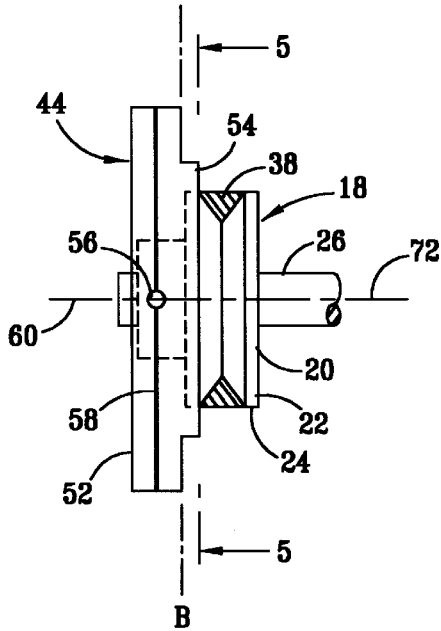
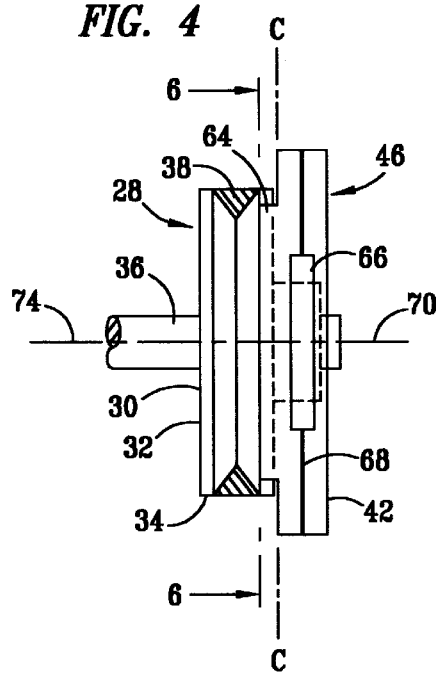

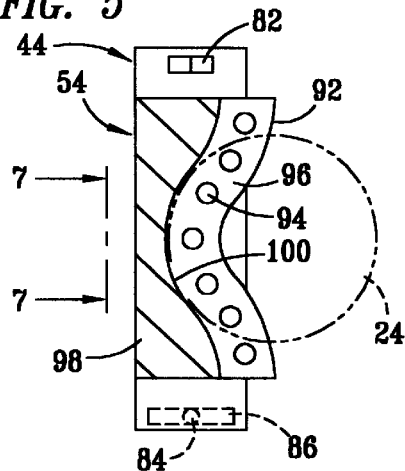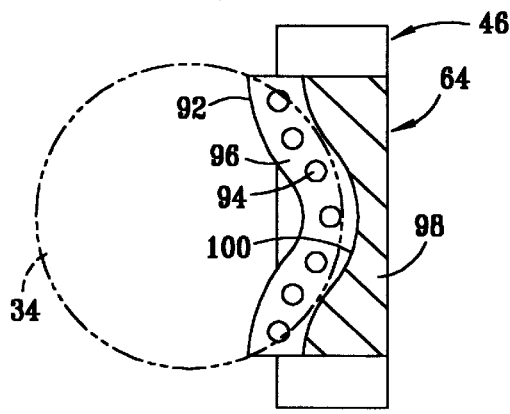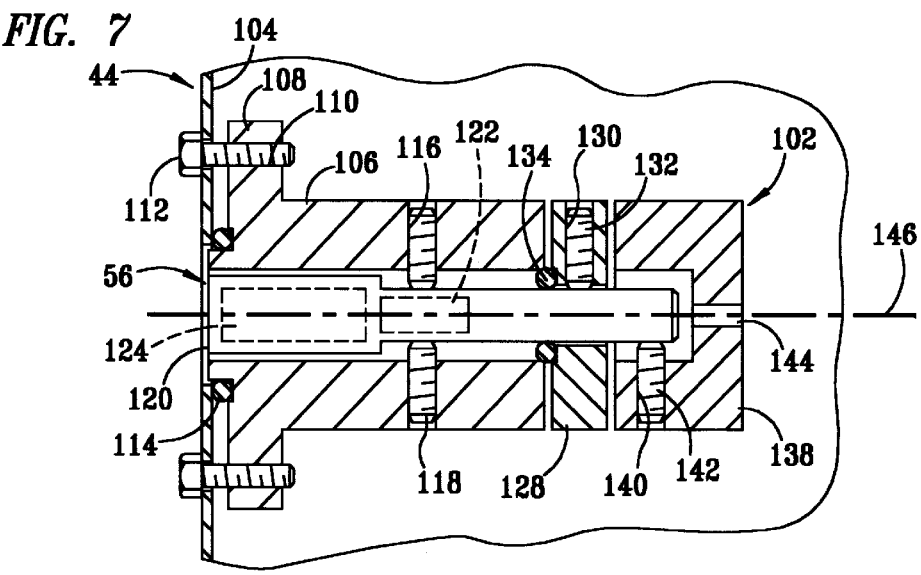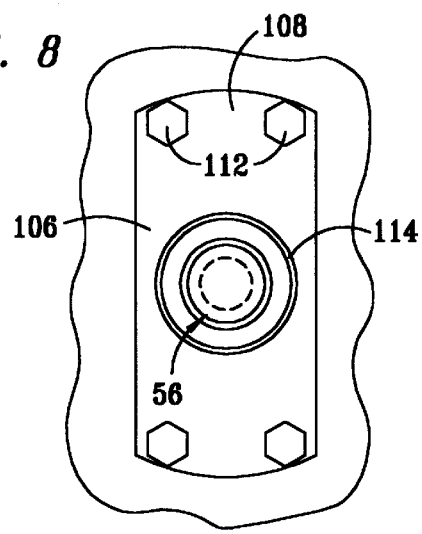

LASER PULLEY ALIGNMENT SYSTEM

TECHNICAL FIELD OF THE INVENTION

The present invention relates in general to laser alignment systems, in particular a laser alignment system for aligning belt transmission systems.

BACKGROUND OF THE INVENTION

Prior art devices have been provided for aligning rotary drive shafts in coaxial alignment and for aligning belt transmission system pulleys. Such devices have included visual indicators which operate by line of sight, such as straight-edge rule indicators which are placed adjacent to the side surfaces of the drive shafts and the side surfaces of the pulleys to visually inspect their respective alignment. Some alignment systems have included optical systems in which a light beam, such as from a laser, is emitted along a linear path and strikes a target having indicator marks to indicate a lineal alignment between two pulleys. Other systems have used a laser emitter which is reflected off a reflective surface of a target and back to the light emitter to detect whether the coaxial alignment of two rotary shafts is acceptable. However, these types of alignment systems operate only for aligning the pulleys or the shafts along a single line of sight connecting between two points.

SUMMARY OF THE INVENTION

A method and apparatus are provided for aligning first and second rotary members with a single alignment plane, such that respective axes about which the first and second rotary members rotate will be substantially perpendicular to the alignment plane. A first fixture having first engagement points is engaged with the first rotary member to align the first fixture in a fixed relation with respect to the rotary member. A line generator is mounted to the first fixture to emit a planar light signal that extends in a plane which is perpendicular to the axis of the first rotary member. A lineal indicator mark is also provided on the first fixture, perpendicular to the axis of the first rotary member and parallel to the plane of the planar light signal. A second fixture having second engagement points is mounted to the second rotary member to align the second fixture in fixed relation to the second rotary member and the respective axis of the second rotary member. A reflective surface and a second lineal indicator mark are mounted to the second fixture. The reflective surface is preferably planar and extends parallel to the respective axis of the second rotary member. The second lineal indicator mark extends parallel to the reflective surface and perpendicular to the axis of the second rotary member. The first and second rotary members are moved to align the planar light signal with the reflective surface and the second lineal indicator mark of the second fixture, such that the planar light signal overlays both the second lineal indicator mark and is reflected from the reflective surface to overlay the first lineal indicator mark of the first fixture. This aligns the respective axes of the first and second fixtures in parallel, and substantially perpendicular to the planar light signal which then defines single alignment plane.

BRIEF DESCRIPTION OF THE DRAWINGS

For a more complete understanding of the present invention and the advantages thereof reference is now made to the following description taken in conjunction with the accompanying drawings in which:

FIG. 1 illustrates a schematic diagram depicting operation of a laser pulley alignment system made according to the present invention;

FIG. 2 illustrates a side elevational view of a belt transmission system extending between a motor and an operating unit, and a laser pulley alignment system made according to the present invention;

FIG. 3 illustrates a sectional view of the belt transmission system and a light emitter of the laser pulley alignment system, taken along section line 3—3 of FIG. 2;

FIG. 4 illustrates a sectional view of the belt transmission system and a reflector unit of the laser pulley alignment system, taken along section line 4—4 of FIG. 2;

FIG. 5 illustrates a sectional view of the light emitter unit of the laser pulley alignment system, taken along section line 5—5 of FIG. 3;

FIG. 6 illustrates a sectional view of the reflector unit of the laser pulley alignment system, taken along section line 6—6 of FIG. 4;

FIG. 7 illustrates a partial sectional view of the light emitter unit of the laser pulley alignment system showing a longitudinal section view of a light emitter mount, taken along section line 7—7 of FIG. 5;

FIG. 8 illustrates a left side, elevation view of the light emitter mount of FIG. 7;

DETAILED DESCRIPTION OF THE INVENTION

Figure 9:
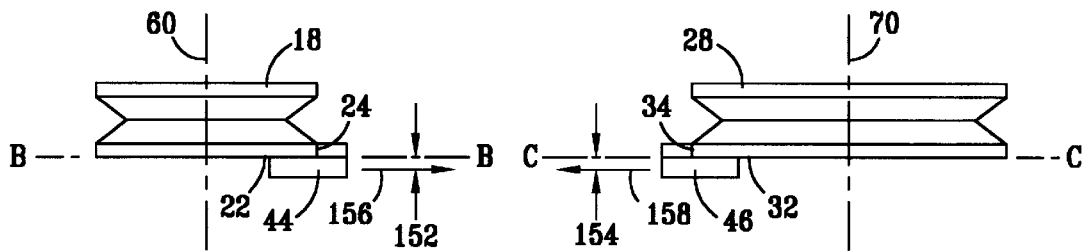
FIG. 9 illustrates a schematic diagram depicting operation of the laser pulley alignment system.

Referring now to FIG. 1, there is illustrated a schematic diagram depicting operation of a laser pulley alignment system 42 for aligning the pulleys 18 and 28 of a belt transmission system 12. The laser pulley alignment system 42 includes a light emitter unit 44 and a reflector unit 46. The light emitter unit 44 includes a laser line generator 56, which emits a planar light signal 48. The planar light signal 48 is preferably a continuous beam of light which widens to a width of nine inches at six feet from the face of the laser line generator 56. A first lineal indicator mark 58 is preferably centered with the laser line generator 56. The light emitter unit 44 is mounted to the pulley 18 such that the lineal indicator mark may be positioned to extend parallel to a line which is tangent to the face of the pulley 18, at a first point on a line connecting the shortest distance between the pulleys 18 and 28. The reflector unit 46 includes a reflective surface 66 and a second lineal indicator line 68, which overlays the reflective surface 66. The reflector unit 46 is preferably mounted to the pulley 28, such that the reflective surface 66 and the indicator line 68 may both be positioned to extend parallel to a line which is tangent to the face of the pulley 28 at a second point on the line connecting the shortest distance between the pulleys 18 and 28. In operation, the planar light signal 48 is emitted from the emitter unit 44, and then the pulleys 18 and 28 are aligned such that the planar light signal 48 will overlay the second lineal indicator mark 68 on the reflector unit 46. This will align the planar light signal 48 with the reflective surface 66.

The pulleys 18 and 28 are then further aligned to align the reflected planar light signal 50 such that it overlays the first lineal indicator mark 58, to place the pulleys 18 and 28 in alignment.

Referring now to FIG. 2, there is illustrated a side elevation view of the belt transmission system 12 for transmitting rotary power from a motor 14 to an operating unit 16, such as an air handler. The belt transmission system 12 includes a pulley 18 having a hub 20, a web 22 and a rim 24. The hub 20 is mounted to a motor shaft 26 of the motor 14. The belt transmission system 12 further includes a pulley 28 having a hub 30, a web 32 and a rim 34. The hub 30 is mounted to a drive shaft 36 of the operating unit 16. A belt 38 couples the pulley 18 to the pulley 28. A laser pulley alignment system 42 is mounted to the pulley 18 and the pulley 28 of the belt transmission system 12 for aligning the pulleys 18 and 28 in a planar alignment, such that the contact points of the pulley 18 with the belt 38 will be substantially parallel to the corresponding contact points of the pulley 28 with the belt 38, and the motor shaft 26 is aligned in parallel with the drive shaft 36 in a plane A—A. The laser pulley alignment system 42 includes a light emitter unit 44 and a light reflector unit 46. The light emitter unit 44 is mounted to the rim 24 and web 22 of the pulley 18. The reflector unit 46 is mounted to the rim 34 and the web 32 of the pulley 28.

Referring now to FIG. 3, there is illustrated a sectional view of the belt transmission system 12 and the laser pulley alignment system 42, taken along section line 3—3 of FIG. 2. The pulley 18 has a central axis 60 about which the pulley 18 will rotate when it is properly aligned with the motor shaft 26. The light emitter unit 44 is mounted to the pulley 18. The light emitter unit 44 is shown mounted to the web 30 and the rim 22 of the pulley 18 along a vertical plane B—B. The vertical plane B—B preferably extends perpendicular to the plane A—A of FIG. 2. The pulley 18 and the light emitter unit 44 may be rotated to face the pulley 28 and the reflector unit 46, and then a planar light signal is emitted from the light emitter unit 44 and travels parallel to the plane B—B to the reflector unit 46, which then, when the pulleys 18 and 28 have been properly adjusted, reflects the planar light signal back from the reflector unit 46 to be received upon the face of the emitter unit 44. The plane of the planar light signal will extend parallel to the plane B—B and perpendicular to the plane A—A.

The light emitter unit 44 includes a housing 52 and a mounting bracket 54, which together provide a first fixture. A laser line generator 56 is mounted to the housing 52 and the mounting bracket 54. The laser line generator 56 is preferably of a type called a "laser diode, single line generator" which provides a planar light signal, such as that available from Power Technologies, Inc., of Little Rock, Ark., as Model No. RS2-635-5L8. The laser line generator 56 will emit a planar light signal, which is a collimated light signal that is spread to extend perpendicular to the direction in which it travels. The collimated light signal is spread such that it expands within the plane of the light signal as it travels to define a line which is preferably of a length of nine inches at a distance of six feet from the face of the emitting face of the line generator 56. A first lineal indicator mark 58 is provided on the housing 52, preferably by a line defined by a painted groove formed into the face of the housing 52. The first lineal indicator line 58 is preferably parallel to the plane B—B which is defined by the interface between the mounting bracket 54 and both the web 22 and the rim 24 of the pulley 18, which is perpendicular to the axis 60 of the drive pulley 18.

Referring now to FIG. 4, there is illustrated a sectional view of the belt transmission system 12 and the laser alignment system 42, taken along section line 4—4 of FIG. 2. The pulley 28 has a central axis 70 about which the pulley 28 will rotate when it is properly aligned with the drive shaft 36. The reflector unit 46 is mounted to the web 32 and the rim 34 of the pulley 28 along an interface plane C—C which is perpendicular to the plane A—A and the axis 70. The reflector unit 46 includes a housing 62 and a mounting bracket 64, which together comprise a second fixture. The reflective surface 66 is mounted to the face of the housing 62, and is preferably a planar mirrored surface which extends perpendicular to the plane C—C and the plane A—A, and parallel to an axis 70 of the pulley 28. A second lineal indicator mark 68 is provided by a painted groove formed into the face of the housing 62. The second lineal indicator mark 68 extends perpendicular to the axis 70 of the pulley 28, when the reflector unit is mounted to the pulley 28, and extends parallel to the plane C—C and preferably parallel to the reflective surface 66, when a planar surface is used for the reflective surface 66. The reflective surface 66 and the lineal indicator mark 68 each comprise indicator members.

Prior to alignment, the axis 60 of the pulley 18 and the axis 70 of the pulley 28 may not be parallel to the central axis 72 of the motor shaft 26 and the central axis 74 of the drive shaft 36, respectively. The lineal indicator mark 58 of the light emitter 44 and the lineal indicator mark 68 of the reflector unit 46 are preferably parallel to the planes B—B and C—C, respectively, which are herein defined relative to the axes 60 and 70 of respective ones of the pulleys 18 and 28, when the light emitter unit 44 and the reflector unit 46 are properly mounted to the pulleys 18 and 28, respectively. Thus the planes B—B and C—C are not necessarily parallel with respect to the central axis 72 of the motor shaft 26 and the central axis 74 of the drive shaft 36, unless the axes 60 and 70 are parallel to the axes 72 and 74, respectively. The axis 60 about which the pulley 18 rotates and the axis 70 about which the pulley 28 rotates are preferably coaxial with respective ones of the motor shaft axis 72 and the drive shaft axis 74.

Referring now to FIG. 5, there is illustrated a sectional view of the light emitter unit 44, taken along section line 5—5 of FIG. 3. A power switch 82 is mounted to a lower portion of the housing 52. A battery charger connector 84 is provided for recharging a rechargeable battery 86, which provides electric power to the power switch 82 for selectively applying to the laser line generator 56 (shown in FIG. 3). The mounting bracket 54 includes a plate 92 having a planar surface which is mounted to the housing 52, such that the planar surface of the plate 92 extends parallel to the planar light signal emitted from the laser line generator 56 and the lineal indicator mark 58 of the emitter unit 44. A plurality of magnets 94 are mounted within the planar surface of the plate 92 to define a plurality of contact points which will mount the plate 92 to the web 22 to the pulley 18. A plate 98 is mounted adjacent to the plate 92, having an arcuately-shaped periphery which defines a shoulder 100. The periphery of the shoulder 100 has an arcuate shape which mounts flush against at least two portions of rims of pulleys of various sizes, such as the rim 24 of the pulley 18 (shown in phantom).

Referring now to FIG. 6, there is illustrated a sectional view of the reflector unit 46, taken along section line 6—6 of FIG. 4. The mounting bracket 64 includes a plate 92 which is mounted to the housing 62 such that a planar surface of the plate 92 extends parallel to the second lineal indicator mark 68 and perpendicular to the reflector surface 66. A plurality of the magnets 94 are mounted in the planar surface of the plate 92 to define a plurality of contact points which will mount the plate 92 to the web 32 to the pulley 28. A plate 98 is mounted adjacent to the plate 92, having an arcuately-shaped periphery which defines a shoulder 100. The periphery of the shoulder 100 has an arcuate shape which mounts flush against at least two portions of rims of pulleys of various sizes, such as the rim 34 of the pulley 28 (shown in phantom).

Referring now to FIG. 7, there is illustrated a sectional view of the light emitter unit 44, taken along section line 7—7 of FIG. 5, which shows a longitudinal section view of a line generator mount 102. The line generator mount 102 is mounted to a wall 104 of the housing 52. The line generator mount 102 has a tubular housing 106. A collar 108 extends around the forward end of the tubular housing 106. Preferably, the collar 108 is defined by a flange of the tubular housing 106. Four mounting holes 110 are provided in the collar 108 for mounting the forward end of the tubular housing 106 to the wall 104. A gimbal ring 114 extends around a forward end of the tubular housing 106, spacing the forward end of the collar 108 apart from the wall 104 such that the mounting screws 112 may be selectively adjusted within the respective ones of the mounting holes 110 to provide an adjustment between the angle at which the tubular housing 106 is mounted to the wall 104. Preferably, the gimbal ring 114 is provided by an elastomeric 0-ring, which is resilient such that the gimbal ring 114 is resilient and will deform when squeezed between the forward end of the collar 108 and the wall 104. Two lateral adjustment holes 116 extend into opposite sides of the tubular housing 106, perpendicular to a longitudinal axis 146 of the tubular housing 106. Two lateral adjustment screws 11 8 are mounted in respective ones of the lateral adjustment holes 116 to provide a lateral adjustment for positioning the line generator 56 within the tubular housing 106.

The line generator 56 includes a housing 120 in which a laser diode 122 is disposed. A light directing member 124 is disposed on the forward end of the housing 120, and preferably will include a combination of a lens and slotted member such that a planar light signal is emitted from the line generator 56. The laser diode 122 preferably emits a collimated light signal, which is then spread by the light directing member 124 to fan outward within a single plane as the light signal travels toward the reflector unit 44.

An annular-shaped collar 128 extends around a rearward portion of the housing 120 of the line generator 56, rearward of the tubular housing 106 and in coaxial alignment with the axis 146. The collar 128 had a threaded hole 130 for receiving a set screw 132. A gimbal ring 134 is disposed around the exterior of the housing 120 of the line generator 56, between the rearward terminal end of the tubular housing 106 and the forward terminal end of the collar 128. Preferably, the gimbal ring 134 is provided by an elastomeric 0ring, which is resilient such that the gimbal ring 134 will deform when pressure is applied by the alignment between the tubular housing 106, the collar 128 and the housing 120 of the line generator 56.

An end cap 138 has a recess for receiving the rearward end of the housing 120 of the line generator 56. A threaded hole 140 is formed laterally into the side of end cap 138 for receiving a set screw 142. The set screw 142 extends from the threaded hole 140 to mount the end cap 138 to the housing 120. A hexagonal shaped hole 144 extends into the rearward central end of the end cap 138. An alien wrench may be inserted into the diagonal shaped hole 144 to rotate the end cap 138, which is securely fastened by the set screw 142 to the housing 120, such that rotation of the end cap 138 will cause rotation of the line generator 56 about a longitudinal axis 146 of the line generator mount 102, when the mount 102 is not firmly gripped between the lateral adjustment screws 118 . This provides an angular adjustment for aligning the line defined by the planar light signal emitted from the line generator 56, relative to the plane B—B and the lineal indicator mark 58 (shown in FIG. 3).

Referring now to FIG. 8 there is illustrated a left side, elevation view of the line generator mount 102 of FIG. 7. The line generator 56 is centrally disposed within the collar 108 of the tubular housing 106. The four holes 110 (shown in FIG. 7) for the mounting screws 112 are spaced apart around the face of the collar 108.

Referring now to FIG. 9, there is illustrated a schematic diagram viewed along the plane A—A of FIG. 2, which illustrates operation of the laser pulley alignment system 42 to align the pulleys 18 and 28, the motor shaft 26 and the drive shaft 36 of the belt transmission system 12. The light emitter unit 44 is mounted flush against the web 22 and the rim 24 of the pulley 18. The reflector unit 46 is mounted flush against the web 32 and the rim 34 of the pulley 28. Power to the light emitter unit 44 is then turned on such that the line generator 56 (shown in FIG. 3) emits a planar light signal 156 which is directed towards the reflector unit 46. The reflector unit 46 is adjusted such that the planar light signal 156 is aligned with the second lineal indicator mark 68 (shown in FIG. 4), adjusting the alignment between the pulley 18 and the pulley 28. It should be noted that the lineal offset 152 between the plane B—B of the pulley 18 and the plane of the planar light signal 156 emitted by the light emitter unit 44 is preferably the same as the offset 154 between plane C—C of the pulley 28 and the second lineal indicator mark 68 of the reflector unit 46 (shown in FIG. 4). The pulleys 18 and 28 are moved to align the relative positioning between the pulleys 18 and 28 to overlay the emitted planar light signal 156 with the second lineal indicator mark 68 (shown in FIG. 4). The pulleys 18 and 28 will typically be aligned by adjusting the positioning of the motor 14 relative to operating unit 16. Then, the pulleys 18 and 28 are further adjusted to reflect the light signal 158 from the reflective surface 66 (shown in FIG. 4) until the reflected planar light signal 156 overlays the first lineal indicator mark 58 (shown in FIG. 3) of the light emitter unit 44. The pulleys 18 and 28 should then be in alignment such that the plane B—B of the pulley 18 is substantially parallel to the plane C—C of the pulley 28. Both of the axes 60 and 70 of the pulleys 18 and 28, respectively, will then be substantially perpendicular to the plane of the planar light signals 156 and 158, and the first lineal indicator mark 58 (shown in FIG. 3) and the second lineal indicator mark 68 (shown in FIG. 4). The axis 60 will be substantially parallel to the axis 70. The pulleys 18 and 28 are then locked into position.

Figure 10:
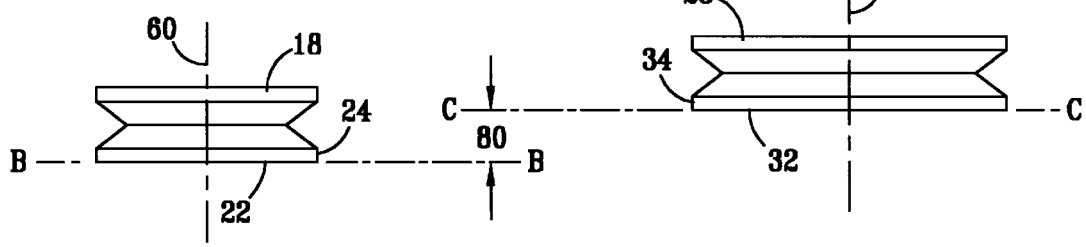
FIG. 10 illustrates a schematic diagram depicting a lateral offset of the two pulleys of the belt transmission system.
Figure 11:
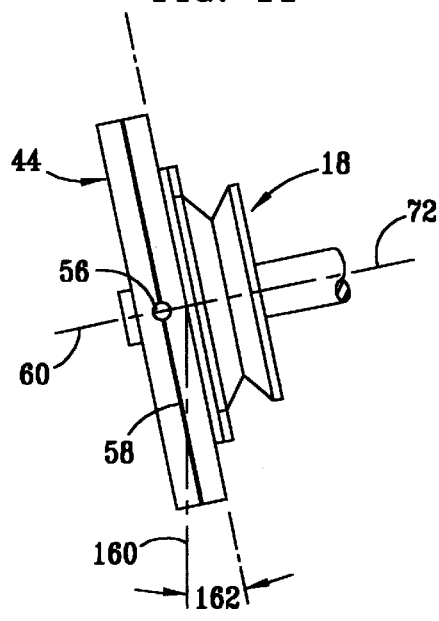
FIG. 11 illustrates a schematic diagram depicting an angular offset from the vertical of one of the pulleys of belt transmission system and the light emitter unit of the laser pulley alignment system.
Figure 12:
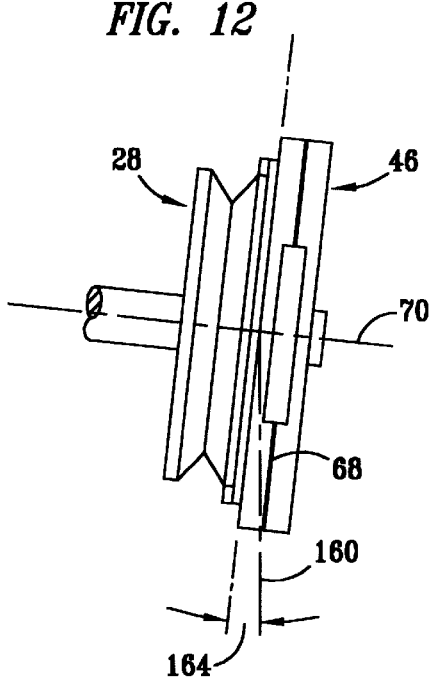
FIG. 12 illustrates a schematic diagram depicting an angular offset from the vertical of one of the pulleys of the belt transmission system and the reflector unit of the laser pulley alignment system.

Referring now to FIGS. 10, 11 and 12, there are illustrated schematic diagrams of various offsets between the pulleys 18 and 28 which require adjustment to properly align the pulleys 18 and 28. FIG. 10 shows a lateral offset between the pulleys 18 and 28, as viewed along the plane A—A of FIG. 2. The plane B—B of the pulley 18 is offset from the plane C—C of the pulley 28 by a lateral offset 80. The pulleys 18 and 28 could also have an angular offset, such that the plane B—B is at an angular offset to the plane C—C. FIG. 11 shows the pulley 18 and the reflector unit 44 offset from a vertical plane 160 by an angular displacement 162. FIG. 12 shows the pulley 28 and the reflector unit 46 offset from the vertical plane 160 by an angular displacement 164.

As shown in FIG. 3, the pulley 18 has the hub 20, the web 22 and the rim 24 which have peripheries that together form a planar surface, which defines the interface plane B—B. As shown in FIG. 4, the pulley 28 has the hub 30, the web 32 and the rim 34 which together have exterior peripheries that together form a planar surface, which defines the interface plane C—C. In other embodiments, the peripheries of the hubs, rims and webs need not define planar surfaces, but may define varying types and shapes of surfaces. Additionally, other type rotary drive members may be provided, such as sprockets for chain drives, non-grooved pulleys, and the like.

The planar light signal of the preferred embodiment discussed above is geometrically defined a continuous light signal which is spread outward in a direction which is perpendicular to the direction of travel of the light signal, as it travels toward a target provided by the reflector unit. In other embodiments, the planar light signal may be provided by two distally spaced linear light signals which are directed to travel along a single line by a directing member, such as that provided by two separately aimed collimated light signals emitted by respective laser diodes, or other light sources. Then, a plane would be defined by the directions of travel of the two light signals. The two laser light signals would then provide a planar light signal which is not continuous for directing toward the reflector unit, rather than providing a collimated planar light signal that is continuous as provided by a single light source which passes through a lens for diverging, or spreading apart. A planar light signal may also be provided by a single laser diode, or other light source, which is directed to extend in two different directions that together define a plane.

The present invention provides several advantages over prior art pulley alignment systems. A planar light signal is emitted from a light emitter unit which has a planar surface which fits against a plane of a pulley, preferably defined by the web and the rim of the pulley, to align the light emitter in fixed relation with the first pulley. A reflector unit has a planar surface which preferably fits against the web and the rim of a second pulley, to align the light reflector unit in fixed relation with the second pulley. The planar light signal is emitted and first aligned to overlay a second lineal indicator mark provided on the reflector unit. The planar light signal is then reflected back from a reflective surface of the reflector unit and aligned to overlay a first lineal indicator mark mounted to the light emitter unit, which places in a substantially parallel alignment the planar surfaces of respective ones of the two pulleys.

Although the preferred embodiment has been described in detail, it should be understood that various changes, substitutions and alterations can be made therein without departing from the spirit and scope of the invention as defined by the appended claims.

What is claimed is:

1. An apparatus for aligning first and second rotary members with a single alignment plane for rotating around respective axes which extend substantially perpendicular to the alignment plane, the apparatus comprising:

a first fixture having first engagement points which engage the first rotary member and align said first fixture with the first rotary member in fixed relation to a first one of the respective axes;

a light source and light directing member which together emit a planar light signal that extends perpendicular to the direction in which said planar light signal is emitted, wherein said light source and said light direction member are mounted in fixed relation to said first fixture such that engagement of said first fixture with the first rotary member orients said planar light signal substantially perpendicular to the first one of the respective axes;

a second fixture having second engagement points which engage the second rotary member and align said second fixture with the second rotary member in fixed relation with a second one of the respective axes;

an indicator member mounted in fixed relation to said second mounting surface, such that engagement of said second fixture to the second rotary member orients said indicator member in substantially fixed relation to the second one of the respective axes; and wherein moving of at least one of the first and second rotary members to align said planar light signal to overlay said indicator member aligns the first and second rotary members with said planar light signal, such that said planar light signal defines the single alignment plane and the respective axes are both substantially perpendicular to said planar light signal.

2. The apparatus of claim 1, wherein said planar light signal is continuous in direction which extends perpendicular to the direction in which said planar light signal is emitted.

3. The apparatus of claim 1, wherein said indicator member comprises a lineal indicator mark which extends perpendicular to the second one of the respective axes.

4. The apparatus of claim 1, further comprising:

a first lineal indicator mark provided on said first fixture, extending substantially within a projected plane relative to said first fixture which is defined by said planar light signal;

said indicator member defining a reflective surface provided on said second member; and wherein said reflective surface of said first lineal indicator mark are aligned with said planar light signal to reflect said planar light signal to overlay said first lineal indicator mark on said first fixture to align the respective axes in parallel and perpendicular to said planar light signal.

5. The apparatus of claim 4, further comprising:

a second lineal indicator mark disposed on said second fixture, extending substantially perpendicular to said second one of said respective axes and within the plane of said planar light signal when said reflective surface of said indicator member is aligned with said planar light signal for reflecting said planar light signal to overlay said first lineal indicator mark provided on said first fixture.

6. The apparatus of claim 1, wherein one of said first and second fixtures further comprises a plate having a planar surface which defines a respective one of said first and second engagement points.

7. The apparatus of claim 6, wherein said one of said first and second fixtures further comprises an arcuately shaped shoulder which extends substantially perpendicular to said planar surface and fits against a rim of a corresponding one of the first and second rotary members, with said planar surface fitting flush against a side of the corresponding one of the first and second rotary members, to align said respective one of said first and second fixtures with the corresponding one of said first and said rotary members in fixed relation to the respective one of the respective axes.

8. The apparatus of claim 1, further comprising a light source and directing member mount which includes:

a housing for securing said light source and said light directing member thereto, said housing having at least two threaded apertures which extend transverse to a longitudinal axis of said housing for receiving lateral adjustment screws;

a collar disposed at forward end of said housing, said collar having a plurality of threaded collar apertures which extend substantially parallel to said longitudinal axis of said housing for mounting said housing to said first fixture; and a cap which fits substantially adjacent to a rearward end of said housing, said cap including a threaded cap aperture for receiving a set screw to non-rotatably secure said cap to said light source, wherein said cap is rotatable relative to said tubular housing to adjust a relative angular alignment between said light directing member and said first fixture.

9. An apparatus for aligning first and second rotary members with a single alignment plane for rotating around respective axes which extend substantially perpendicular to the alignment plane, the apparatus comprising:

a first fixture having first engagement points and a first shoulder, said first engagement points engaging a first side of the first rotary member, and said first shoulder extending substantially perpendicular to said first engagement points and fitting against a rim of the first rotary member, to align said first fixture with the first rotary member in fixed relation to a first one of the respective axes;

a light source and light directing member, which together emit a planar light signal that extends perpendicular to the direction in which said planar light signal is emitted, wherein said light source and said light direction member are mounted in fixed relation to said first fixture such that engagement of said first fixture with the first rotary member orients said planar light signal substantially perpendicular to the first one of the respective axes;

a second fixture having second engagement points and a second shoulder, said second engagement points engaging a second side of the second rotary member, and said second shoulder extending substantially perpendicular to said second engagement points and fitting against a second rim of the second rotary member, to align said second fixture with the second rotary member in fixed relation to a second one of the respective axes;

an indicator member mounted in fixed relation to said second mounting surface, such that engagement of said second fixture to the second rotary member orients said indicator member in fixed relation to the second one of the respective axes; and wherein moving of at least one of the first and second rotary members to align said planar light signal to substantially overlay said indicator member aligns the first and second rotary members with said planar light signal, such that said planar light signal defines the single alignment plane and the respective axes are both substantially perpendicular to said planar light signal.

10. The apparatus of claim 9, wherein said planar light signal is continuous in direction which extends perpendicular to the direction in which said planar light signal is emitted.

11. The apparatus of claim 9, wherein said lineal indicator member comprises a lineal indicator mark which extends perpendicular to the second one of the respective axes.

12. The apparatus of claim 9, further comprising:

a first lineal indicator mark provided on said first fixture, extending substantially within a projected plane relative to said first fixture which is defined by said planar light signal;

said indicator member being defined by a reflective surface, which extends parallel to a first one of the axes; and wherein said reflective surface and said first lineal indicator mark are aligned with said planar light signal to reflect said planar light signal to overlay said first lineal indicator mark on said first fixture to align the respective axes in parallel and perpendicular to said planar light signal.

13. The apparatus of claim 12, further comprising:

a second lineal indicator mark disposed on said second fixture, extending parallel to said indicator member and within the plane of said planar light signal when said indicator member is aligned with said planar light signal for reflecting said planar light signal to overlay said first lineal indicator mark provided on said first fixture.

14. The apparatus of claim 9, wherein said first fixture includes magnets mounted within said first plate for securing said first fixture to said first rotary member.

15. The apparatus of claim 9, said first and second shoulders each comprise arcuately shaped surfaces for accommodating rotary members of various sizes.

16. The apparatus of claim 9, further comprising a light source and directing member mount which includes:

a tubular housing for interiorly receiving at least part of said light source and said light directing member, said tubular housing having two threaded apertures which extend transverse to a longitudinal axis of said tubular housing for receiving lateral adjustment screws;

a collar extending around a forward end of said tubular housing, said collar having a plurality of threaded apertures which extend substantially parallel to said longitudinal axis of said tubular housing for mounting said tubular housing to said first fixture; and a cap which fits substantially adjacent to a rearward end of said tubular housing, said cap including a threaded cap aperture for receiving a set screw to nonrotatably secure said light directing member to said cap, wherein said cap is rotatable relative to said tubular housing to adjust a relative angular alignment between said light directing member and said first fixture.

17. An apparatus for aligning first and second rotary members with a single alignment plane for rotating around respective axes which extend substantially perpendicular to the alignment plane, the apparatus comprising:

a first fixture having a first planar surface and a first shoulder, said first planar surface defining first engagement points which engage a side of the first rotary member, and said first shoulder extending substantially perpendicular to said first planar surface and fitting against a rim of the first rotary member, with said first planar surface fitting flush against a first side of the first rotary member to align said first fixture with the first rotary member in fixed relation to a first one of the respective axes;

a line generator having a light source and light direction member, which together emit a planar light signal that extends perpendicular to the direction in which said planar light signal is emitted, wherein said line generator is mounted in fixed relation to said first fixture such that engagement of said first fixture with the first rotary member orients said planar light signal substantially perpendicular to the first one of the respective axes;

a lineal indicator mark provided on said first fixture, extending substantially within a projected plane relative to said first fixture which is defined by said planar light signal;

a second fixture having a second planar surface and a second shoulder, said second planar surface defining second engagement points which engage a second side of the second rotary member, and said second shoulder extending substantially perpendicular to said second planar surface and fitting against a second rim of the second rotary member, with said second planar surface fitting flush against a second side of the second rotary member to align said second fixture with the second rotary member in fixed relation to a second one of the respective axes;

a reflective surface and a second lineal indicator mark disposed on said first fixture in fixed relation to said second mounting surface, such that engagement of said second fixture to the second rotary member orients said reflective surface substantially parallel to and said second lineal indicator mark substantially perpendicular to the second one of the respective axes; and wherein moving of at least one of the first and second rotary members to align said planar light signal to substantially overlay said second indicator mark and reflect said planar light signal from said reflective surface to overlay said first indicator mark aligns the first and second rotary members with said planar light signal, such that said planar light signal defines the single alignment plane and the respective axes are both substantially perpendicular to said planar light signal.

18. The apparatus of claim 17, wherein said planar light signal is continuous in said direction which said planar light signal extends perpendicular to said direction of travel.

19. The apparatus of claim 18, wherein said first and second fixtures include magnets mounted within respective ones of said first and second planar surfaces for securing said first fixture to said first rotary member and said second fixture to said second rotary member.

20. The apparatus of claim 19, wherein said first and second shoulders each comprise arcuately shaped surfaces for accommodating rotary members of various sizes.

21. The apparatus of claim 20, further comprising a line generator mount which includes:

a tubular housing for receiving a forward end of said line generator, said tubular housing having at least two threaded apertures which extend transverse to a longitudinal axis of said line generator for receiving lateral adjustment screws;

a collar which extends around a forward end of said housing, said collar having a plurality of threaded collar apertures which extend substantially parallel to said longitudinal axis of said line generator for mounting said tubular housing to said first fixture; and a cap which fits substantially adjacent to a rearward end of said tubular housing, said cap including a threaded cap aperture for receiving a set screw to nonrotatably secure said line generator to said cap, wherein said cap is rotatable relative to said tubular housing to adjust a relative angular alignment between said line generator and said first fixture.

22. A method for aligning first and second rotary members with a single alignment plane for rotating around respective axes which extend substantially perpendicular to the alignment plane, comprising:

providing a light source mounted to a first fixture and an indicator member mounted to a second fixture;

directing light emitted from the light source as a planar light signal that extends perpendicular to the direction in which the planar light signal is emitted to define a planar light signal;

engaging the first fixture with the first rotary member to align the planar light signal in fixed relation to a first one of the respective axes, such that the planar light signal is disposed substantially perpendicular to a first one of the respective axes;

engaging the second fixture with the second rotary member to align the indicator member in fixed relation to a second one of the respective axes; and moving of at least one of the first and second rotary members to align the planar light signal to substantially overlay the lineal indicator member, which aligns the first and second rotary members with the planar light signal such that the planar light signal defines the single alignment plane and the respective axes are both substantially perpendicular to the planar light signal.

23. The method of claim 22, wherein the step of providing an indicator member mounted to the second fixture comprises providing a lineal indicator mark which extends perpendicular to the second one of the respective axes.

24. The method of claim 22, further comprising:

providing a lineal indicator mark on the first fixture, extending substantially within a projected plane relative to the first fixture which is defined by the planar light signal;

wherein the step of providing the indicator member mounted to the second fixture includes mounting a reflective surface to the second fixture; and wherein the step of moving of at least one of the first and second rotary members to align the planar light signal to substantially overlay the indicator member includes aligning the reflective surface of the indicator member with the planar light signal to reflect the planar light signal to overlay the lineal indicator mark.

25. The method of claim 24, further comprises providing a second lineal indicator mark on the second fixture which extends parallel to the lineal indicator member and within the plane of the planar light signal when the indicator member is aligned with the planar light signal for reflecting the planar light signal to overlay the lineal indicator mark provided on the first fixture.

* * * * *